United States Patent [19]
Jang

[11] Patent Number: 5,862,627
[45] Date of Patent: Jan. 26, 1999

[54] METHOD FOR GERMINATING DEHULLED BROWN RICE

[75] Inventor: Se-Soon Jang, Kyunggi-Do, Rep. of Korea

[73] Assignee: Sang-Ho Lee, Rep. of Korea; 1/2 Interest assigned to

[21] Appl. No.: 56,501

[22] Filed: Apr. 7, 1998

[51] Int. Cl.$^6$ .............................. A01B 79/00; A01G 9/10; A23L 1/10; A23L 1/00

[52] U.S. Cl. ................................ 47/58.1; 47/77; 426/482; 426/483; 426/507; 426/511; 426/618; 426/320; 426/312

[58] Field of Search ...................... 47/58.1, 77; 426/482, 426/483, 507, 511, 312, 320, 618

[56] References Cited

U.S. PATENT DOCUMENTS

| | | | |
|---|---|---|---|
| 4,497,839 | 2/1985 | Hashimoto | 426/482 |
| 5,209,940 | 5/1993 | Champagne et al. | 426/320 |
| 5,700,505 | 12/1997 | Hurst | 426/312 |

*Primary Examiner*—Robert A. Wax
*Assistant Examiner*—Tekchand Saidha
*Attorney, Agent, or Firm*—Lahive & Cockfield, LLP

[57] ABSTRACT

This invention relates to a method for germinating dehulled brown rice comprising the steps of selecting fully matured rice having strong germination force among rice having peeled-off chaffs immersed in salty water, pounding the selected fully matured rice into dehulled brown rice, germinating primarily the dehulled brown rice in the water for 6 to 10 hours at a temperature of 12° to 18° C. and thereafter remaining in the water for 1 to 8 hours at a moderate increased temperature of 20° to 32° C. germinating the primary germinating dehulled brown rice which is located at approximately 1 cm above a water level at ambient temperature for 2 to 5 hours, and next the free of water dehulled brown rice being immersed in the salty water or mud-deposited water for 8 to 24 hours at a temperature of 20° C. and repeating the germination of the dehulled brown rice in ambient air and in the salty water or mud-deposited water until bubbles are observed from the dehulled brown rice, and germinating repeatedly the dehulled brown rice in the ambient air at a temperature of 26° to 32° C. and in the salty water or mud-deposited water at the same temperature until a predetermined germinating level is observed from the dehulled brown rice.

9 Claims, 8 Drawing Sheets

METHOD FOR GERMINATING DEHULLED BROWN RICE

RELATED APPLICATIONS

This application is related to co-pending Korean Patent Application Serial No. 97-12837, filed on Apr. 8, 1997, the entire contents of which are hereby incorporated by reference.

FIELD OF THE INVENTION

The present invention relates to a method for germinating dehulled brown rice. In particular, the present invention relates to a method for germinating dehulled brown rice in ambient air and in salty water or mud-deposited water repeatedly.

Generally, many studies prove that a dietary life usually consisting of convenience food or meats causes possible diseases for adults to accelerate due to acid poisoning of blood. As a countermeasure to prevent these diseases of adults, the American Institute for Cancer Research (AICR) and the World Cancer Research Fund (WCRF) recommend that meat in the diet should be changed to a diet of cereals and animal fat ingestion should be reduced so that more than half of the cancer occurrence can be prevented if only 10% of necessary calories is intaken from animal foods. It is worth noticing that the recommendation comes from analyzing 4500 theses collected from the distinguished scholars during three and a half years. The publication recommends the ingestion of brown rice, bread made from starch, vegetables, fruits, and beans to prevent cancer on the assumption that how the dietary life can be improved. That is, the grain and vegetable diet is recommended for ingesting much dietetic fiber that is lacking in the meat diet.

Generally, brown rice contains vegetable cellulose, various enzymes, and inorganic matter including minerals, etc. in a large volume. The resistance force to disease is increased and the acid poisoning of blood can be prevented and blood is changed into the blood having an alkaline characteristic. The brown rice is well known as a useful food to prevent aging and to strengthen the function of internal organs. U.S. Senator McGovern Report is one of the references which show a superior effect of the vegetable cellulose contained in the brown rice.

Although the brown rice has the noticeable benefit, polished white rice in which an inner layer or a larger quantity of vegetable fiber is peeled-off is consumed as the chief food. The reason is as follows. Firstly, a misconception still exists that the polished rice has less content of agricultural chemicals than the brown rice, without knowledge of physiological phenomena that the dietetic fiber absorbs various agricultural chemicals in the internal organs and then discharges the treated chemicals. Secondly, a general rice cooker is inconvenient to cook the brown rice. Finally, the cooked brown rice can not be chewed well, and may be unsuitable to the palate owing to its unpurity. If these problems are solved, the brown rice diet will be accepted without any rejection to have an immense effect.

On the other hand, the World Health Organization (WHO) recommends 8 g of dietetic fiber be intaken per day by an adult, and the Health-Welfare Ministry, Japan recommends 15 to 20 g. However, the recommended amount of dietetic fiber is the possible volume to continue the dietary life when taking only grain and vegetables. The need which extracts only dietetic fiber is requested.

The conventional technique for extracting the dietetic fiber was developed in Germany, which is the method for extracting the water-soluble dietetic fiber from oranges and vegetables. The Otsuka Pharmacy Company, Japan is manufacturing a health drink "FIBE-MINI". But, the low efficient dietetic fiber has merely about 0.5 g per bottle compared with the brown rice in the above water-soluble product. A more noticeable effective method for extracting the dietetic fiber is desired on the whole world basis.

SUMMARY OF THE INVENTION

It is an object of the present invention to provide a method for germinating dehulled brown rice to solve the above problems.

It is a further object of the present invention to provide a method for germinating dehulled brown rice for effectively germinating the brown rice having various nutrients as well as large amounts of dietetic fiber without becoming rotten, and maximizing the nutrient value of the brown rice by the physiological phenomenon at start of the growth process.

It is a further object of the present invention to provide a method for germinating dehulled brown rice which eliminates agricultural chemicals, and is cooked conveniently with smooth, sweet taste, and selects respective grown brown rice suitable to various physical constitution.

It is a further object of the present invention to provide a method for germinating dehulled brown rice for fully germinating the brown rice until only dietetic fiber remains and for utilizing the extracted dietetic fiber as both preventive and curing means.

In order to achieve the above objects of the present invention, a method for germinating dehulled brown rice is shown, the method comprises the steps of selecting fully matured rice having strong germination force among rice having peeled-off chaffs immersed in salty water, pounding the selected fully matured rice into dehulled brown rice, and germinating repeatedly the dehulled brown rice in the ambient air and in the salty water or the mud-deposited water.

BRIEF DESCRIPTION OF THE DRAWINGS

Embodiments of the present invention will hereinafter be described, by way of example, with reference to the accompanying drawings in which.

DESCRIPTION OF THE PREFERRED EMBODIMENTS

Figure 1:
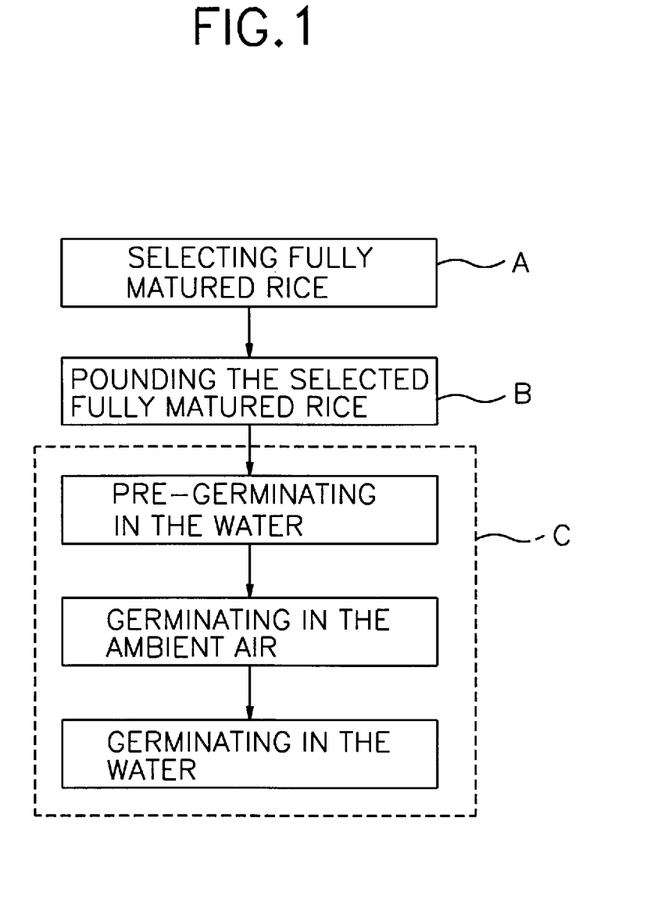
FIG. 1 is the illustration showing a method for germinating dehulled brown rice according to a present invention.

FIG. 1 illustrates a method for germinating dehulled brown rice. The steps of the method comprise a step A for selecting fully matured rice having strong germination force among rice having non-peeled-off chaffs immersed in salty water, a step B for pounding the selected fully matured rice into dehulled brown rice, and a step C for repeatedly proceeding with a water germinating process in which the dehulled brown rice is stored in a steel net immersed in the water during a predetermined time and an ambient air germinating process in which the net is lifted at a predetermined distance above a water level and disposed in an ambient air.

Figure 2A:
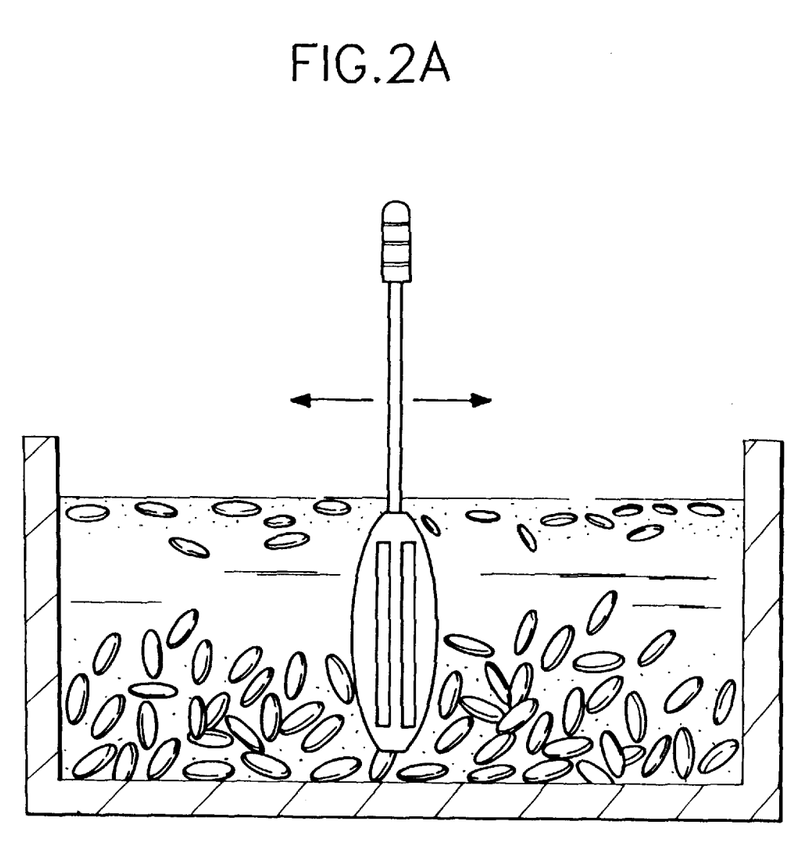
FIG. 2A is the illustration showing a step for selecting fully matured rice of FIG. 1.
Figure 2B:
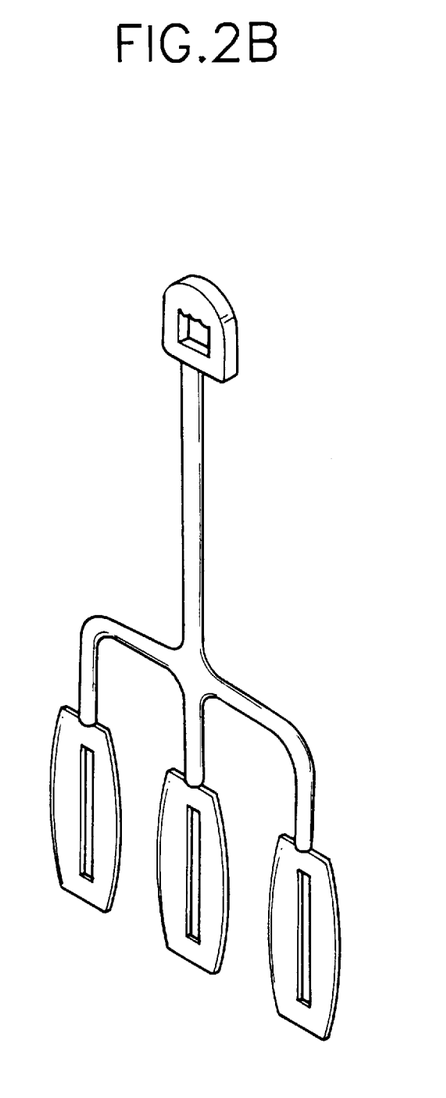
FIG. 2B is an embodiment of an agitator using in FIG. 2A, FIGS. 3A and 3B are illustrations of the germinating steps of the dehulled brown rice.

In FIG. 2A illustrating the step A, rice having the non-peeled-off chaffs is disposed in salty water having 70 to 100 wt % of salt as an ingredient. The non-fully matured rice having weak germination force floats on the water owing to the swirling water by an agitator. The floating rice is taken out from the water so that only the matured rice having the strong germination force is picked up. The reason to pick up the fully matured rice is that non-fully matured rice can not be germinated and thus perishes. The agitator which is used for performing the embodiment of the invention is illustrated in FIG. 2B, but additional device for automatically operating agitator can be employed in the treating process of large amounts of rice. The selected dehulled brown rice proceeds through a conventional pounding step B by which the chaffs are peeled off to become the dehulled brown rice.

Figure 3A:
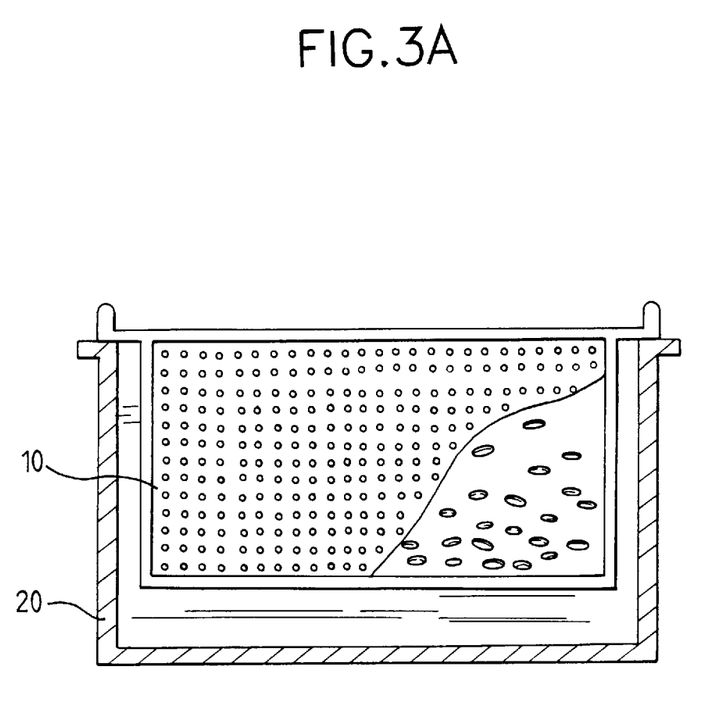
Figure 3B:
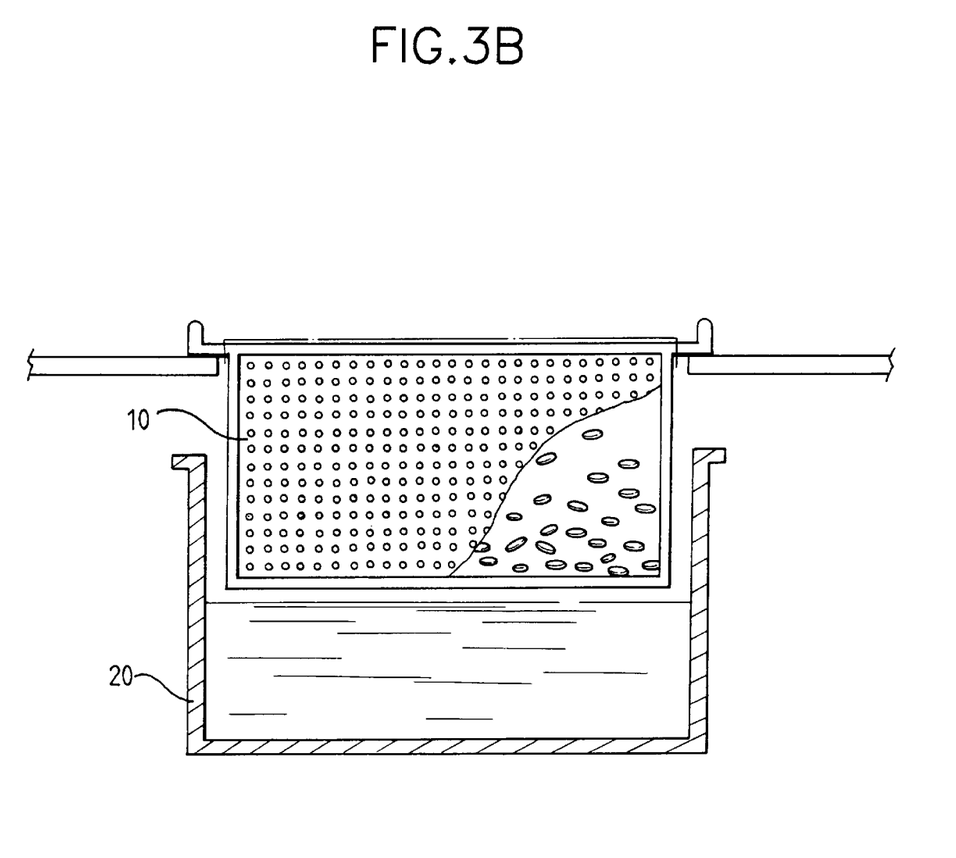

FIGS. 3A and 3B illustrate the germinating step C of the dehulled brown rice. The germinating step C is comprised of the sub-steps of selecting fully matured rice, pounding the selected fully matured rice, and germinating the dehulled brown rice.

In the rice selecting step, the fully matured rice having strong germination force is selected among rice having non-peeled-off chaffs contained in a steel net 10 having plural openings which is immersed in salty water.

In the pounding step, the selected fully matured rice is pounded into dehulled brown rice.

The germinating sub-step is further comprised of the first stage for germinating primarily the dehulled brown rice in the water for 6 to 10 hours at a temperature of 12° to 18° C. and thereafter remaining in the water for 1 to 8 hours at a moderately increased temperature of 20° to 32° C.

The second stage constituted of the germinating sub-step is to germinate the primary germinating dehulled brown rice which is located at approximately 1 cm above a water level at ambient temperature for 2 to 5 hours and which is blanketed by wet clothes, and next the free-of-water dehulled brown rice is immersed in the salty water or mud-deposited water for 8 to 24 hours at a temperature of 20° C. The germination of the dehulled brown rice in the ambient air and in the salty water or mud-deposited water is repeated until bubbles are observed at the dehulled brown rice.

The third stage is that the germination of the dehulled brown rice in the ambient air at a temperature of 26° to 32° C. and in the salty water or mud-deposited water at the same temperature is repeated until predetermined germinating level is observed at the dehulled brown rice.

During the in-water germination of the dehulled brown rice in the above process, turbidity is observed in the salty water or mud-deposited water of a water container 20. That occurs when noxious matter including agricultural chemicals is neutralized or discharged owing to the self-cleaning effect of the brown rice. The study of germination effect of plant proves that the action of detoxication as well as various nutrients are maximized at the germination of plant. In particular, a research report of Max Frank Foods Research, Germany indicated that brown rice in germination mode has the maximum activity of various nutrients.

A hard outer layer of the dehulled brown rice becomes soft after repeated germination in ambient air and in the water. Even if the softened brown rice through the germination step C is cooked in the same method as white rice, the brown rice diet which has a glutinous, smooth, and sweet taste can be served.

Figure 4A:
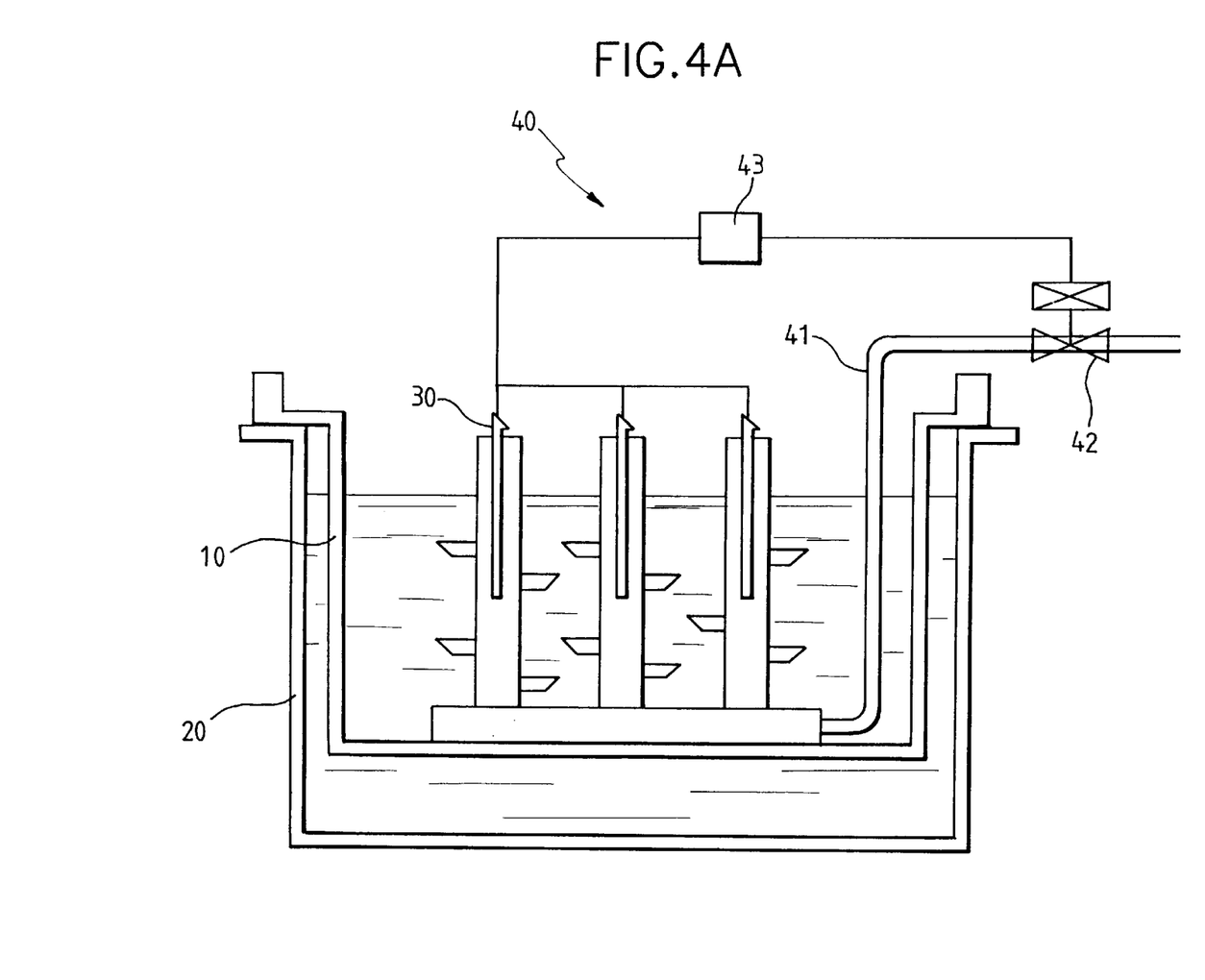
FIGS. 4A, 4B, and 4C are an embodiment showing an apparatus for germinating large amounts of dehulled brown rice according to the present invention.
Figure 4B:
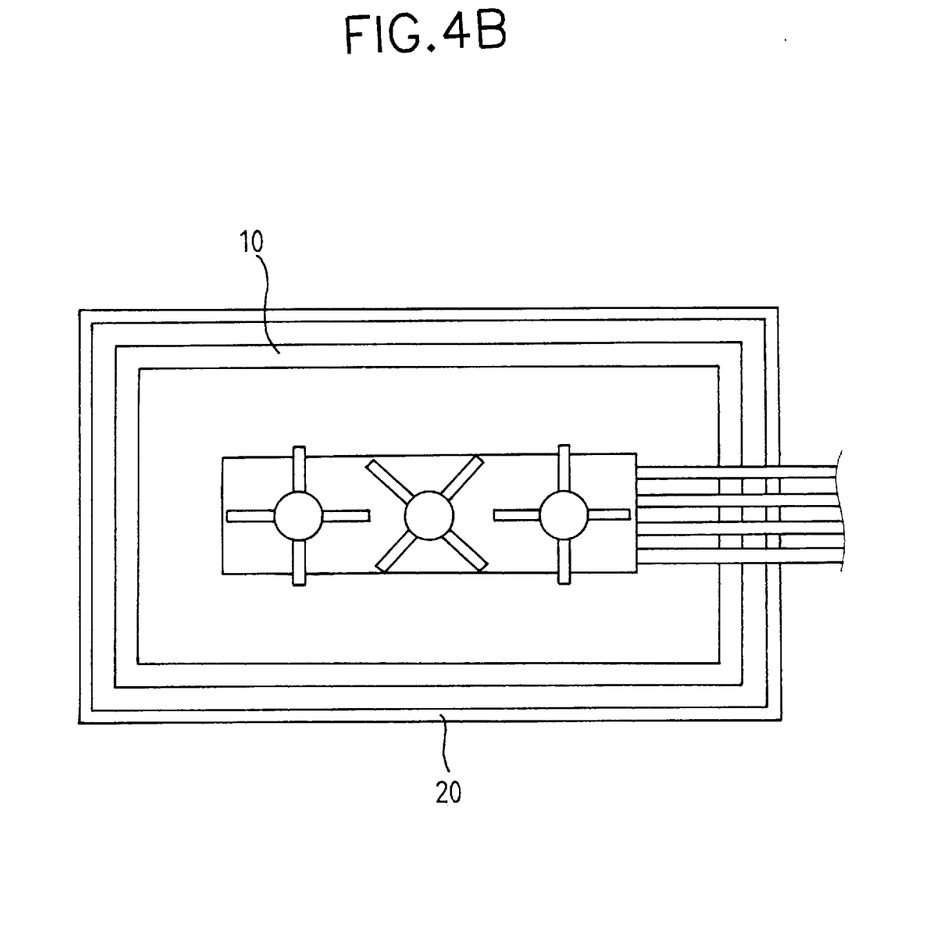
Figure 4C:
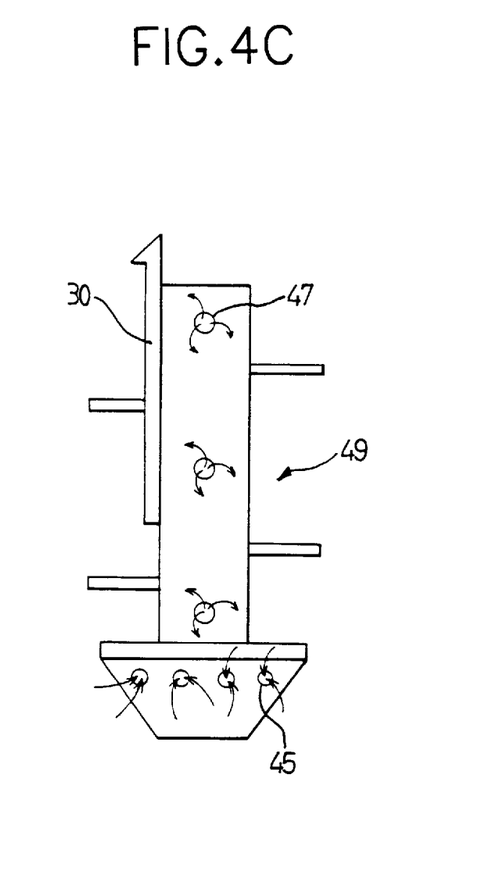

FIGS. 4A, 4B, and 4C illustrate the method of germination of large amounts of dehulled brown rice according to the present invention. An apparatus for conducting the above method is comprised of a sensor 30 for detecting an interior temperature of brown rice, and a temperature controller 40 for maintaining a constant interior temperature of the brown rice by cool air blowing.

The temperature controller 40 is comprised of an air chamber 49 in which plural air inlets 45 and plural air outlets 47 are provided, a control valve 43 for controlling volume of air to the air chamber 49 through an air pipe 41, and a temperature controller 43 for controlling the control valve 43 under the detecting condition of the sensor 30. The apparatus is suitable for the mass production of brown rice to maintain a constant water temperature in the container 20. The apparatus is one embodiment to conduct the prevent invention. Although preferred embodiment of the invention have been disclosed for illustrative purposes, those skilled in the art will appreciate that various modifications, additions, and substitutions are possible without departing from the scope of the invention.

The brown rice germinated according to the present invention has various effects upon foods in which the effects are adaptable to different physical conditions, respectively.

When a seedling of the germinating brown rice is grown at less than 1 mm, the brown rice is in the onset of germination, at which time the self-cleaning action and various nutrients which are needed at start of the growth process is in the most noticeable condition. That is preferable for a person who has a lean physical condition even if much food is eaten. Since enzyme activity is poor and the nature of bacteria and the environment around the bacteria in internal organ is inefficient with respect to the person having a lean physical condition, the above treated brown rice can improve that person's physical condition.

When a seedling of the germination brown rice grows 1.5 mm to 2.5 mm, nutrients are nearly exhausted. However, the above treated brown rice has the increased amounts of dietetic fiber, minerals, protein, and vitamin B group which can have a noticeable curing effect upon disease of adults. That is preferable to a person who is obese.

The results of components analysis between the brown rice having 2.5 mm seedlings treated by the above method and the white rice are given in Table 1.

TABLE 1

|  | white rice | germinated brown rice |
|---|---|---|
| Lime power (%) | 0.34 | 1.34 |
| Cofat (%) | 1.10 (acid resolution method) | 2.87 (acid resolution method) |
| Coprotein (%) | 7.07 (nitrogen coefficient) | 8.06 (nitrogen coefficient) |
| Carbohydrates (%) | 81.61 | 78.70 |
| Calorie (kcal) | 364.62 | 372.87 |
| Dietetic fiber (%) | 0.25 | 1.28 |
| Phosphorus (mg/100 g) | 77.25 | 255.61 |
| Calcium (mg/100 g) | 6.61 | 12.71 |
| Iron (mg/100 g) | 1.25 | 1.75 |
| Sodium (%) | 0.021 | 0.023 |
| Vitamin B1 (mg/100 g) | 0.06 (HPLC method) | 0.2 (HPLC method) |
| Vitamin B2 (mg/100 g) | 0.002 (HLPC method) | 0.03 (HLPC method) |

This report is analyzed by Korean Foods Research.

As shown in Table 1, the number of calorie of the brown rice is nearly the same as that of the white rice, but each value of dietetic fiber, calcium, vitamin, and mineral is noticeably higher. Especially, the high values of Vitamin B1 and Vitamin B2 indicate that no problems occur in nutrient absorption even without a meat diet.

On the other hand, when a seedling of the germination brown rice has grown 3 mm to 4 mm, small amounts of nutrients remain, and albumen is nearly exhausted. Furthermore, minerals, vitamin, and dietetic fiber which is non-watersoluable and strong to digestive enzymes or heat are remained. The powder of the germinating brown rice which is treated in the above method falls under the category of a practically perfect dietetic fiber diet. The food has the daily intake of dietetic fiber for an adult which is recommended by World Health Organization and the Health-Welfare Ministry of Japan.

The extracting method of the present invention is simpler than the method in Germany or of the Otsuka Pharmaceutical Company, Japan by which water-soluble dietetic fiber can be extracted from the orange. Further, larger amounts of dietetic fiber can be easily obtained.

If the dehulled brown rice is germinated in the water until the seedling has grown to more than 3 mm, the brown rice becomes rotten and no roots can sprout. Therefore, considering that rice is one species of plant, the in-water germination method is processed in the upper water region or supernatant of mud-deposited water of the water container 20. The mud-deposited water contains 80 to 100 g yellow soil per 100 kl water and is deposited for about 24 hours. The roots of the brown rice do not become rotten after the seedling of the brown rice has grown to more than 4 mm.

According to the present invention as described above, the dehulled brown rice for effectively germinating the brown rice having various nutrients as well as large amounts of dietetic fiber is germinated without becoming rotten, and the nutrient value of the brown rice by the physiological phenomenon at start of the growth process can be maximized. The agricultural chemicals can be eliminated, and the brown rice is cooked conveniently with smooth, sweet taste, and the respective grown brown rice is suitable for various physical constitutions. The dietetic fiber extracted from the fully germinated brown rice in which only dietetic fiber remains is utilized as both preventive and curing means.

I claim:

1. A method for germinating dehulled brown rice, the method comprising the steps of:

selecting fully matured rice having strong germination force among rice having peeled-off chaffs immersed in salty water;

pounding the selected fully matured rice into dehulled brown rice;

germinating primarily the dehulled brown rice in the water for 6 to 10 hours at a temperature of 12° to 18° C. and thereafter remaining in the water for 1 to 8 hours at a moderate increased temperature of 20° to 32° C., germinating the primary germinating dehulled brown rice which is located at approximately 1 cm above a water level in ambient air for 2 to 5 hours, and next the free-of-water dehulled brown rice being immersed in the salty water or mud-deposited water for 8 to 24 hours at a temperature of 20° C. and repeating the germination of the dehulled brown rice in ambient air and in the salty water or mud-deposited water until bubbles are observed from the dehulled brown rice; and germinating repeatedly the dehulled brown rice in ambient air at a temperature of 26° to 32° C. and in the salty water or mud-deposited water at the same temperature until predetermined germinating level is observed from the dehulled brown rice.

2. The method for germinating dehulled brown rice according to claim 1, wherein the water germination step proceeds in the upper water region or supernatant of mud-deposited water which contains 80 to 100 g yellow soil per 100 kl water and is deposited for approximately 24 hours.

3. The method for germinating dehulled brown rice according to claim 1, wherein a seedling of dehulled brown rice is grown at below 1.0 mm.

4. The method for germinating dehulled brown rice according to claim 1, wherein a seedling of dehulled brown rice is grown at 1.5 to 2.5 mm.

5. The method for germinating dehulled brown rice according to claim 2, wherein a seedling of dehulled brown rice is grown above 3.0 mm.

6. The method for germinating dehulled brown rice according to claim 5, wherein the seedling has only mineral and dietetic fiber.

7. A rice product produced in accordance with the method defined in claim 3.

8. A rice product produced in accordance with the method defined in claim 4.

9. A rice product produced in accordance with the method defined in claim 5.

* * * * *

UNITED STATES PATENT AND TRADEMARK OFFICE
CERTIFICATE OF CORRECTION

PATENT NO. : 5,862,627
DATED : January 26, 1999
INVENTOR(S) : Se-Soon Jang

It is certified that error appears in the above-identified patent and that said Letters Patent is hereby corrected as shown below:

On the title page, insert

--[30] Foreign Application Priority Data
Apr8il 8, 1997 [KR] Korea ....... 97-12837--

Signed and Sealed this

Thirteenth Day of July, 1999

Attest:

Q. TODD DICKINSON

*Attesting Officer*  *Acting Commissioner of Patents and Trademarks*